US008862450B2

(12) United States Patent
Derfoul et al.

(10) Patent No.: US 8,862,450 B2
(45) Date of Patent: Oct. 14, 2014

(54) METHOD OF DEVELOPING A PETROLEUM RESERVOIR FROM HISTORY MATCHING OF PRODUCTION DATA AND SEISMIC DATA

(75) Inventors: Ratiba Derfoul, Chevannes (FR); Elodie Tillier, Rueil Malmaison (FR); Sebastien Da Veiga, Paris (FR)

(73) Assignee: IFP Energies Nouvelles, Rueil-Malmaison, Cedex (FR)

( * ) Notice: Subject to any disclaimer, the term of this patent is extended or adjusted under 35 U.S.C. 154(b) by 365 days.

(21) Appl. No.: 13/275,350

(22) Filed: Oct. 18, 2011

(65) Prior Publication Data
US 2012/0109597 A1 May 3, 2012

(30) Foreign Application Priority Data

Oct. 28, 2010 (FR) .................................. 10 04246
Mar. 11, 2011 (EP) .................................. 11290122

(51) Int. Cl.
| | | |
|---|---|---|
| *E21B 43/00* | (2006.01) | |
| *E21B 49/00* | (2006.01) | |
| *G01V 1/28* | (2006.01) | |
| *G06F 17/10* | (2006.01) | |
| *G06F 17/40* | (2006.01) | |

(52) U.S. Cl.
CPC ............. *E21B 43/00* (2013.01); *G01V 2210/74* (2013.01); *E21B 49/00* (2013.01); *G01V 1/28* (2013.01); *G01V 2210/665* (2013.01); *G01V 2210/66* (2013.01)
USPC ................................................ 703/10; 703/2

(58) Field of Classification Search
CPC ......... E21B 43/00; E21B 49/00; G06F 17/10; G06F 17/40; G01V 1/28; G01V 2210/66; G01V 2210/665; G01V 2210/74
See application file for complete search history.

(56) References Cited

PUBLICATIONS

Gervais et al., Integration of saturation data in a history matching process based on adaptive local parameterization, J. Petroleum Sci. and Eng. 73 (2010) 86-98.*
Honarkhah et al., Stochastic Simulation of Patterns Using Distance-Based Pattern Modeling, Math Geosci. 42 (2010) 487-517.*
Maris, Distance-based Parameterisation and History Matching, M.S. Thesis, 2009.*
MacKay, David. J.C. (Sep. 2003), Information Theory, Inference and Learning Algorithms. Cambridge; Cambridge University Press. ISBN 0-521-64298-1. (pp. 284-292).

(Continued)

*Primary Examiner* — Kamini S Shah
*Assistant Examiner* — Michael P Healey
(74) *Attorney, Agent, or Firm* — Antonelli, Terry, Stout & Kraus, LLP.

(57) ABSTRACT

A method of developing a petroleum reservoir from a reservoir model constrained by the production data and seismic attributes. Production data and seismic data are acquired during the development of the reservoir. A first image of a seismic attribute is constructed from the seismic data. Production responses are simulated from a reservoir model using a flow simulator. An image corresponding to the seismic attribute is simulated from the reservoir model. A local dissimilarity map is constructed from the reference seismic attribute image and from the simulated seismic attribute image. The reservoir model is modified to minimize any difference between the measured production data and the corresponding production responses and to minimize local dissimilarities. This model is used to determine an optimal development scheme and the reservoir is developed according to the development scheme.

34 Claims, 3 Drawing Sheets

(56) References Cited

PUBLICATIONS

Baudrier, Étienne et al: Binary-image Comparison with Local-Dissimilarity Quantification, Pattern Recognition, vol. 41, Issue 5, 2008, 1461-1478, ISSN 0031-3203, DOI: 10.1016/j.patcog.2007.07.011.

Molchanov, Ilya S. et al: Distance Transforms for Real-Valued Functions, J. Math. Anal. Appl. 278, 2003, 472-484.

Sinoquet D, et al: Adapted Nonlinear Optimization Method for Production Data and 4D Seismic Inversion, ECMOR European Conference on the Mathematics of Oil Recovery, 11$^{th}$, Bergen, Norway, Sep. 8-11, 2008. (9 pages).

\* cited by examiner

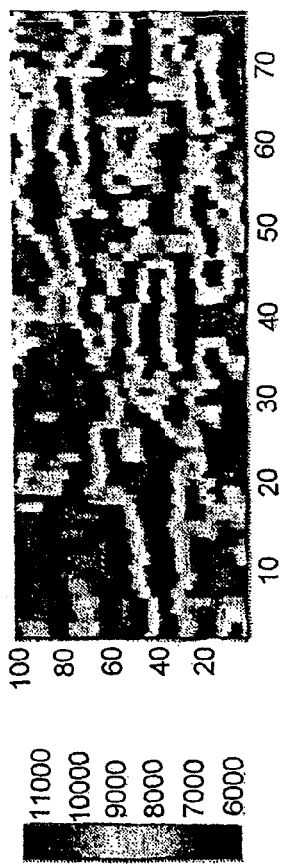
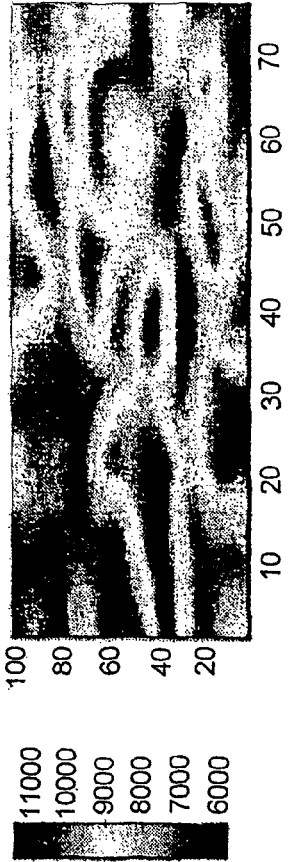
Fig. 2
Fig. 3
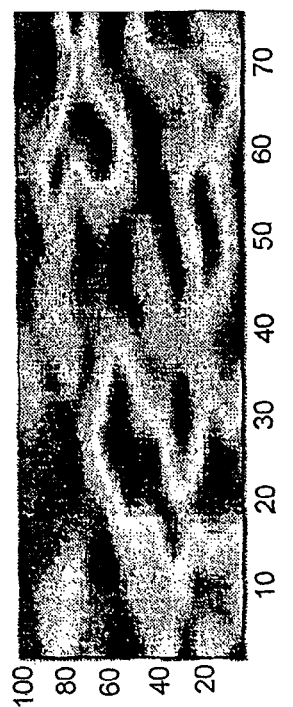

METHOD OF DEVELOPING A PETROLEUM RESERVOIR FROM HISTORY MATCHING OF PRODUCTION DATA AND SEISMIC DATA

BACKGROUND OF THE INVENTION

1. Field of the Invention

The present invention relates to the petroleum industry, and more particularly to the development of underground reservoirs such as petroleum reservoirs or gas storage sites. In particular, the invention allows modification of a representation of the reservoir, referred to as reservoir model, in order to make it coherent with various data collected in the field.

2. Description of the Prior Art

Optimization and development of petroleum reservoirs are based on the most accurate possible description of the structure, the petrophysical properties, the fluid properties, etc., of the reservoir. A tool accounting for these aspects in an approximate way is a reservoir model which is a model of the subsoil, representative of both its structure and its behavior. Generally, this model is represented in a computer and is referred to as a numerical model. A reservoir model comprises a grid, generally three-dimensional, associated with one or more petrophysical property maps (porosity, permeability, saturation, etc.). The association assigns values of these petrophysical properties to each cell of the grid.

These models which are well known and widely used in the petroleum industry, allow determination of many technical parameters relative to the study or the development of a reservoir such as a hydrocarbon reservoir. In fact, since the reservoir model is representative of the structure of the reservoir and of the behavior thereof, engineers use the model to determine which zones are the most likely to contain hydrocarbons, the zones in which it can be interesting/necessary to drill an injection or a production well in order to enhance hydrocarbon recovery, the type of tools to use, the properties of the fluids used and recovered, etc. These interpretations of reservoir models in terms of "technical development parameters" are well known. Similarly, modelling $CO_2$ storage sites allows monitoring these sites, to detect abnormal behaviours and to predict the displacement of the injected $CO_2$.

The purpose of a reservoir model thus is to best account for all the available information on a reservoir. A reservoir model is representative when a reservoir simulation provides historical data estimations that are very close to the observed data. What is referred to as historical data are the production data obtained from measurements in wells in response to the reservoir production (oil production, water production of one or more wells, gas/oil ratio (GOR), production water proportion (water cut)), and/or repetitive seismic data (4D seismic impedances in one or more regions, etc.). A reservoir simulation is a technique allowing simulation of fluid flows within a reservoir by software referred to as the flow simulator, and the reservoir model.

Integration of all the available data is therefore essential. These data generally comprise:
- measurements at certain points of the geological formation, in wells for example. These data are referred to as static because they are invariable in time (on the scale of the reservoir production times);
- "historical data", comprising production data, for example the fluid flow rates measured in wells, tracer concentrations and data obtained from repetitive seismic acquisition campaigns at successive times. These data are referred to as dynamic because they evolve during the development and they are indirectly linked with the properties assigned to the cells of the reservoir model.

Techniques for integration of dynamic data (production and/or 4 D seismic) in a reservoir model are known and are referred to as "history matching" techniques.

History matching modifies the parameters of a reservoir model, such as permeabilities, porosities or well skins (representing damages around the well), fault connections, etc., in order to minimize the differences between the simulated and measured historical data. The parameters can be linked with geographic regions, such as permeabilities or porosities around one or more wells. The difference between real data and simulated data forms a functional referred to as objective function. The history matching problem is solved by minimizing this functional. The objective function is usually calculated as the sum of the square of the errors between simulated data and measured data. This formulation has proved efficient for the production data insofar as it characterizes correctly the error observed between the simulated and measured data, and it is significantly reduces during the optimization process. For the seismic data, this formulation is not suitable because it is not representative of the observed difference between two seismic attribute images. The optimization process can therefore not reduce it significantly.

SUMMARY OF THE INVENTION

The invention thus is an alternative method for optimizing the development of an underground medium, from a reservoir model. The method comprises history matching of this model to dynamic data, using, for seismic data matching, an objective function based on a measurement of the dissimilarities between a seismic attribute image obtained from measurements and a seismic attribute image obtained from a simulation based on the reservoir model.

From a reservoir model having a set of grid cells discretizing the medium, a value of at least one parameter being assigned to each cell, production data and seismic data are acquired during development of the medium. The following stages are then carried out:
- simulating production data from the reservoir model using a flow simulator;
- constructing a first image of at least one seismic attribute from the seismic data;
- constructing a second image of the seismic attribute from the reservoir model;
- applying a classification technique for converting each seismic attribute image to a classified image containing at least two seismic attribute classes with each pixel of a classified image being associated with a class number;
- constructing a map of the local dissimilarities between the classified images;
- modifying the parameter values of the reservoir model to minimize a difference between the measured production data and the simulated production data, and to minimize the local dissimilarities;
- using the model with the modified parameter values to define an optimal development scheme for the underground medium; and
- developing the underground medium according to the development scheme.

According to an embodiment, the local dissimilarity is based on a measurement of a Hausdorff distance measuring a minimum distance between a first pixel having a given class number and a second pixel having a different class number that is the closest to the first pixel in one single classified image. According to this embodiment, the local dissimilarity can be calculated by carrying out the following stages:

defining a portion of the first classified image where the pixels have the same class number NC;

defining a portion of the second classified image where the pixels have the same class number equal to NC;

for each pixel i of said first classified image or the second classified image:

If pixel i belongs to none of the portions and the dissimilarity is zero;

If pixel i belongs to the portions and the dissimilarity is zero; and

If pixel i belongs to one of the portions only, the dissimilarity is equal to the non-zero minimum distance calculated on the first classified image or the second classified image.

When the number of classes is greater than two, a set of binary images can be constructed for each seismic attribute image with each binary image containing two classes. The dissimilarity of the classified images is then defined by a weighted sum of dissimilarities of the binary images.

According to the invention, the classification technique can be a k-means technique.

Prior to applying the classification technique, part of the noise contained in the seismic attribute images can be advantageously removed through filtering.

According to the invention, the difference between the measured production data and the simulated production data can be measured by an objective function defined as follows:

$$OF_{prod} = \frac{1}{2}\left(\sum_{i=1}^{Np} w_i\left(d_i^{prod,sim} - d_i^{prod,mes}\right)^2\right)^{1/2}$$

where $d_i^{prod,sim}$ is the i-th simulated production datum, Np is the number of production data, $d_i^{prod,mes}$ is the i-th measured production datum and $w_i$ is a weight.

According to the invention, the local dissimilarities CDL can be minimized using an objective function defined as follows:

$$OF_{sismiq} = \frac{1}{2}\left(\sum_{i=1}^{N}(CDL(i))^2\right)^{1/2}$$

where N is the number of pixels of the seismic attribute images.

The production data can comprise fluid flow rate data measured at the level of wells drilled through the medium and/or concentrations of tracers injected into the medium. Finally, the parameters can be selected among characteristic properties of the medium, such as porosity and permeability.

BRIEF DESCRIPTION OF THE DRAWINGS

Other features and advantages of the method according to the invention will be clear from reading the description hereafter of embodiments given by way of non limitative examples, with reference to the accompanying figures wherein:

FIG. 2 shows two images A and B representing the subsoil;

FIG. 3 illustrates the result obtained after filtering these images A and B;

DETAILED DESCRIPTION

Figure 1:
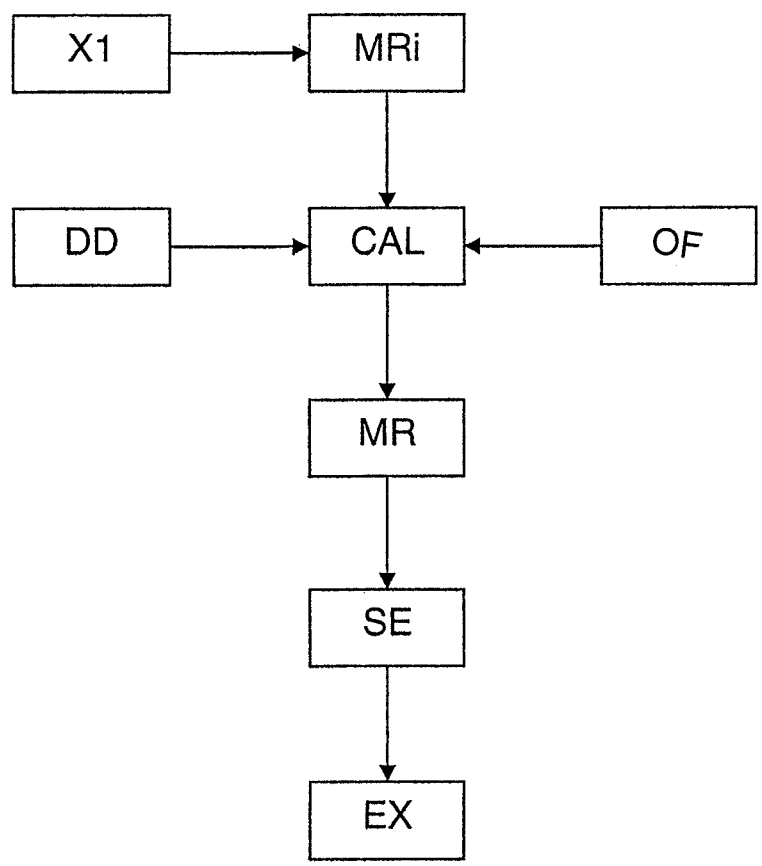
FIG. 1 illustrates the method of developing a petroleum reservoir according to the invention.

FIG. 1 illustrates the method of developing a petroleum reservoir according to the invention. The method essentially comprises four stages:

1. generating an initial reservoir model (MRi) from a set of parameters (X1) obtained from observations and measurements;
2. acquiring dynamic data (DD) during the reservoir development and defining an objective function (OF) for history matching. The objective function for the production data is an objective function of least squares type. The objective function for the repetitive seismic data is calculated according to the process as follows:
   i. pre-processing (through filtering and classification) measured and simulated seismic attribute images in order to extract the characteristics thereof;
   ii. calculating a map of the local dissimilarities between the measured seismic attribute image and the simulated seismic attribute image after pre-processing stage (i);
   iii. the objective function for the seismic map being considered is calculated from the local dissimilarity map.
3. performing history matching (CAL) by carrying out the following stages:
   i. modifying the set of parameters (X1) and then modifying the initial reservoir model so as to obtain a model MR; and
   ii. repeating stage (i) until the objective function converges towards a minimum (MIN).
4. developing (EX) the reservoir according to a development scheme (SE) suited to the reservoir model.

1—Generating an Initial Reservoir Model (MRi)

Geological formations are generally very heterogeneous media. Modelling a reservoir, that is constructing a reservoir model representative of the reservoir, requires using construction methods referred to as "probabilistic" due to the limitation of available information (limited number of wells, etc.). The geological models constructed from these probabilistic methods are therefore referred to as "stochastic models". Construction of a stochastic reservoir model first has to depend on the environment of the geological deposit, which allows representation of the major heterogeneities controlling the fluid flow. Integration of the static data in this model requires linear operations and it can be done from known geostatistical techniques.

A reservoir model represented in a computer includes a grid with N dimensions (N>0 and generally two or three) with each cell thereon being assigned the value of a property characteristic of the zone under study. It can be, for example, the porosity or the permeability distributed in a reservoir. These values make up maps. Thus, a model is a grid associated with at least one map. The initial maps are determined by a set of parameters (X1). One of these parameters can be, for example, the porosity mean. In this case, a mean porosity map (X1) is generated stochastically. A modification of this parameter therefore leads to a modification of the model.

From such models, it is possible to appreciate the way the underground zone under study works. For example, simulation of the flows in a porous medium represented by numerical stochastic models allows, among other things, to predict the reservoir production and thus to optimize its development by testing various scenarios, so as to determine the most efficient scenario.

2—Dynamic Data (DD) Acquisition

At this stage, the dynamic data have not been considered for constructing the reservoir model. Dynamic data are thus acquired during the reservoir development. These data are production data, well test data, breakthrough times, and 4D seismic data, etc., whose specific feature is to vary over time according to the fluid flows in the reservoir.

This stage is carried out by means of measuring tools such as flow meters or seismic campaigns.

These dynamic data are then integrated in the reservoir model through optimization (history matching).

3—History Matching (CAL)

The map (associated with the reservoir model) is modified to minimize an objective function measuring the difference between the dynamic data obtained from measurements and the dynamic data estimated from the reservoir representation (reservoir model). This stage is carried out by means of a computer.

A technical software referred to as flow simulator is used to minimize the production data. This software allows simulation of the production data from the reservoir model. An objective function is then used to measure the error between measured and simulated production data, denoted by $OF_{prod}$. An objective function of the least squares type can be used. It is then written as follows:

$$OF_{prod} = \frac{1}{2}\left(\sum_{i=1}^{Np} w_i \left(d_i^{prod,sim} - d_i^{prod,mes}\right)^2\right)^{1/2}$$

where $d_i^{prod,sim}$ is an i-th simulated production datum, Np is the number of production data, $d_i^{prod,mes}$ is an i-th measured production datum and $w_i$ is the weight associated with this datum.

To minimize the seismic data, a first image of at least one seismic attribute (impedance P for example) is constructed from the seismic data. A second image of this seismic attribute is then constructed from the reservoir model. There are many known techniques for carrying out this simulation. Usually, flow simulation allows obtaining pressure and saturation maps. The petro-elastic model then allows determination of the seismic attribute maps (velocity, P and S impedances) from the elastic properties of the rock and from the pressures and saturations. Next a map of the local dissimilarities, between these seismic attribute images, is constructed. Finally, an objective function based on this map is used to measure the error between measured and simulated seismic data, denoted by $OF_{sismiq}$. In order to simplify the presentation, a single type of seismic attribute, the P impedances denoted by IP, is presented. This means that it is attempted to obtain a simulated IP map that is as close as possible to the IP map measured in the field.

(i) Seismic Image Pre-Processing

A seismic attribute image is a set of N pixels with each pixel taking the value of the IP at the point considered. A seismic IP map contains a large amount of information which is difficult to assimilate by the optimization process. This is why pre-processing is used in order to extract the essential characteristics thereof. It is these essential characteristics that are to be reproduced by simulation. This pre-processing comprises two stages, filtering and classification.

Filtering

Seismic attribute images generally contain much noise. In order to overcome the effect of noise and to improve classification, the seismic attribute images are filtered by a moving average.

Classification

Classification of the seismic attribute images separates the IP values into several classes. The number of classes can be 2 or more. In the case of 2 classes, classification amounts to converting a color seismic attribute image to a black and white seismic attribute image (binary image). By increasing the number of classes, the color image is converted to a grey level image. This stage is carried out by means of a usual classification algorithm referred to as k-means. A description thereof can be found in:

MacKay, David J. C. (September 2003). Information Theory, Inference and Learning Algorithms. Cambridge: Cambridge University Press. ISBN 0-521-64298-1.

K-means is a data partitioning algorithm allowing the data to be classified into k sets. The elements of each set are as close as possible to one another, and as far as possible from the elements of the other sets.

To achieve this partitioning, the algorithm works iteratively. Initially, the barycenters of each set are randomly set. The algorithm then assigns the elements to one or the other of the sets depending on the closeness thereof to its barycenter. The algorithm then calculates the new barycenters of each set. Next the elements are re-assigned to one or to the other of the sets depending on the closeness thereof to the new barycenter. This process is repeated until none of the elements is re-assigned to a new set any more.

Many classification algorithms can be used by the method according to the invention.

The classified image thus is a set of N pixels taking integer values ranging between 0 and (k−1). The rest of the presentation relates to the case k=2, but it can be generalized to any number of classes.

When the number of classes is two, classification allows obtaining a binary image. The classified measured seismic attribute image is defined by a set of pixels X of value 0 or 1. One chooses to interpret value 1 as the information (the opposite choice is possible and has no consequence on the method) and value 0 as the "background" of the image. A is the portion of the filtered and classified measured image where the pixels are equal to 1. That is A is defined by A={i∈X/X(i)=1}. Similarly, B is the portion of the filtered and classified simulated image where the pixels are equal to 1. That is B is defined by B={i∈X/X(i)=1}. Sets A and B represent a "shape" drawn in black on a white "background".

(ii) Local Dissimilarity Map

A map of the local dissimilarities (CDL) between images A and B is defined by means of a local measurement of the Hausdorff distance, as described in:

Baudrier, E., Nicolier, F., Millon, G., Ruan, S., Binary-image Comparison with Local-Dissimilarity Quantification, Pattern Recognition, Volume 41, Issue 5, 2008, 1461-1478, ISSN 0031-3203, DOI: 10.1016/j.patcog.2007.07.011.

The local dissimilarity measured at pixel i is denoted by CDL(i). The CDL is measured for each pixel of set X (each cell of the model is a pixel). The CDL is based on a local measurement of the Hausdorff distance. It is defined as follows:

$$CDL(i) = \max(d_H(i, A), d_H(i, B))1_{A\Delta B}$$

where $$1_{A\Delta B} = \begin{cases} 1 & \text{if } i \in A\Delta B \\ 0 & \text{otherwise,} \end{cases}$$

$$A\Delta B = (A \setminus B) \cup (B \setminus A),$$

and $$d_H(i, A) = \min_{j \in A}(d(i, j));$$

$d(i, j)$ being the Euclidian distance between pixels $i$ and $j$.

This definition means that, for each pixel of set X, it is determined whether this pixel belongs to both sets A and B, to none of them or to one of the two sets only.

If the pixel belongs neither to A nor to B, it means that this pixel is white (that is value 0) for both images and the CDL thus is zero;

If the pixel belongs to both sets A and B, it means that this pixel is black (that is value 1) for both images and the CDL is then also zero since the two images at this pixel are identical;

If the pixel belongs to only one of the sets, the distance between this pixel and the closest black pixel is then checked. For one of the two images, this pixel is black and therefore the closest pixel is also black, which gives a zero distance. For the other image, the pixel is white and the distance to the closest black pixel is calculated. The CDL is equal to this distance.

The local dissimilarities are summed to obtain a global error that is integrated in the objective function. The sum is given in the form of a norm. A norm L1 (sum of the absolute values) or L2 (sum of the squares of the errors) can be used for example. In the case of L2, the objective function for the seismic data is written as follows:

$$OF_{sismiq} = \frac{1}{2}\left(\sum_{i=1}^{N}(CDL(i))^2\right)^{1/2}$$

where N is a number of pixels of the seismic images.

Of Importance

It is chosen here to consider value 1 as information and value 0 as the background of the image. Assigning value 1 to a class and value 0 to the other can be done according to various criteria. The choice is made once and for all prior to matching which depends on the reference seismic attribute image to be matched and on what is considered to be the main information in this image. For example, in the case of gas injection, the gas bubble will be the information. From a practical point of view, the computation time is better when assigning a value 1 to the class containing the smallest number of elements.

(iii) Generalization to any Number of Classes

There are several ways of generalizing the method to a larger number of classes. The first solution compares the images class by class and considers all of the other classes to be nonsignificant (that is, the background of the image). The other solution generalizes the distance between two binary pixels to a distance between two pixels defined by a grey level. A possible formulation is provided in:

Ilya S. Molchanov and Pedro Terán, Distance Transforms for Real-Valued Functions, J. Math Anal. Appl. 278, 2003, 472-484.

The principle of this formulation defines a set of binary images from the grey level image. More precisely, for each grey level threshold, a binary image is defined with the white pixels being the pixels with a grey level below the defined threshold and the black pixels being the pixels with a grey level above the threshold. The distance transform of the grey level image is then defined as a weighted sum of the distance transforms of all the binary images generated from the grey level image.

The objective function denoted by OF is finally written as a sum of the objective functions on the production data and the seismic data. It is thus written $OF=OF_{prod}+OF_{sismiq}$. It is of course possible to add a multiplicative coefficient to each of these terms to increase the weight of a data type in relation to the other. This coefficient is determined by the user according to the expected result and to the type of history matching being performed.

Objective function OF is now minimized by an optimization method. The optimization method can be a quasi-Newton type method for example, such as SQPAL, described in the following document:

Sinoquet and Delbos, "Adapted Nonlinear Optimization Method for Production Data and 4D seismic Inversion", ECMOR European Conference on the Mathematics of Oil Recovery, 11th, Bergen, Norway, 8-11 Sep. 2008.

The optimizer determines a descent direction. That is it sets the perturbations to be brought to the set of parameters (X1) to decrease the objective function, and consequently to minimize the difference between the measured production data and the simulated production data to minimize the local dissimilarities.

4—Reservoir Development According to a Suitable Development Scheme (EX-SE)

From such a reservoir model matched with the dynamic data, that is with both the production data and the seismic data, various development schemes (location of producer wells, injector wells, etc.) can be tested. They use a flow simulator to estimate the volume of oil recovered when using a given scheme, and by considering the history-matched reservoir model.

Comparing for example the volume of oil recovered allows determination of the production scheme which is likely to afford the maximum recovery level.

The reservoir is then developed according to this development scheme.

Application Example

Figure 4:
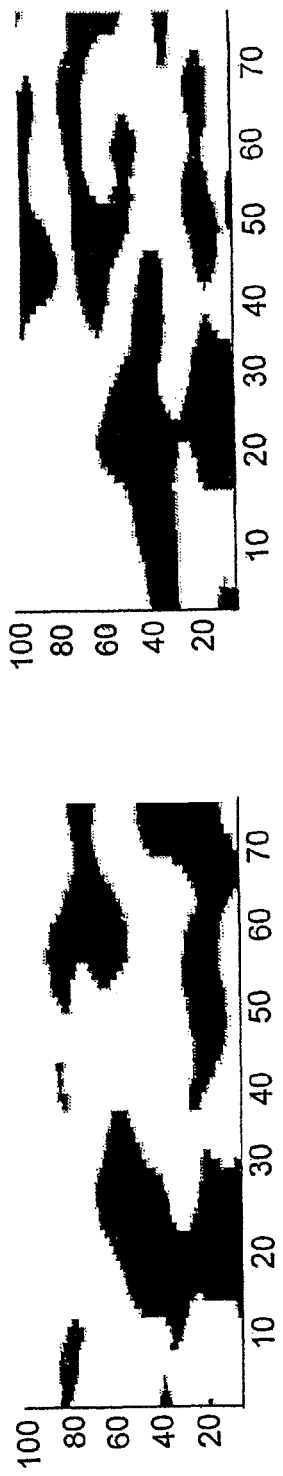
FIG. 4 illustrates the result of the classification of images A and B.
Figure 5:
FIG. 5 shows the map of the local dissimilarities between images A and B.

To illustrate the method, the difference between two seismic attribute images (in 2D) is measured using the formulation provided. The seismic attribute images are two P impedance maps representing the subsoil, denoted by A (left in FIG. 2) and B (right in FIG. 2). The images are first filtered (FIG. 3, A filtered to the left and B filtered to the right), then classified (FIG. 4, A classified to the left and B classified to the right), thus allowing calculation of the map of the local dissimilarities between images A and B (FIG. 5). This map is finally summed to obtain the term to be included in the objective function.

The invention claimed is:

1. A method for optimizing development of an underground medium, from a reservoir model including a set of grid cells discretizing the medium with values of at least one parameter being assigned to each cell wherein production data and seismic data are measured during said development of the medium, comprising:

simulating said production data from the reservoir model using a flow simulator;

constructing a first image of at least one seismic attribute from the seismic data;

constructing a second image of the at least one seismic attribute from the reservoir model;

converting each seismic attribute image to a classified image containing at least two seismic attribute classes with each pixel of the classified images being associated with a class number;

constructing a map of local dissimilarities between the classified images;

modifying said values of the at least one parameter in each cell of the reservoir model to minimize a difference between the measured production data and the simulated production data, and to minimize the local dissimilarities;

using the model with the modified values to define an optimal development of the underground medium; and developing the underground medium according to the optimal development.

2. A method as claimed in claim 1, wherein the local dissimilarities are based on a measurement of a Hausdorff distance representing a minimum distance between a first pixel having a given class number and a second pixel having a different class number that is closest to the first pixel in a single classified image.

3. A method as claimed in claim 2, wherein the local dissimilarities are determined by defining a portion of the first classified image where pixels of said portion of the first classified image have an identical class number and defining a portion of the second classified image where pixels of said portion of the second classified image have said identical class number, and for each pixel i of the first classified image or of the second classified image:

a) if said pixel i belongs to none of the portions, a dissimilarity at said pixel i is zero;

b) if said pixel i belongs to both of the portions, said dissimilarity at said pixel i is zero; and c) if said pixel i belongs to only one of the portions, said dissimilarity at said pixel i is equal to a non-zero minimum distance calculated for the first classified image or the second classified image.

4. A method as claimed in claim 3, wherein:

a number of the classes is greater than two and a set of binary images is constructed for each seismic attribute image; and for each binary image containing two classes, dissimilarity of the classified images is defined by a weighted sum of dissimilarities of the binary images.

5. A method as claimed in claim 4, wherein the classified images are obtained by k-means classification.

6. A method as claimed in claim 5 wherein, prior to classification, a portion of noise contained in the images of the seismic attributes is removed through filtering.

7. A method as claimed in claim 4 wherein, prior to classification, a portion of noise contained in the images of the seismic attributes is removed through filtering.

8. A method as claimed in claim 3, wherein the classified images are obtained by k-means classification.

9. A method as claimed in claim 8 wherein, prior to classification, a portion of noise contained in the images of the seismic attributes is removed through filtering.

10. A method as claimed in claim 3 wherein, prior to classification, a portion of noise contained in the images of the seismic attributes is removed through filtering.

11. A method as claimed in claim 3, wherein said difference between the measured production data and the simulated production data is measured by an objective function defined as follows:

$$OF_{prod} = \frac{1}{2}\left(\sum_{i=1}^{Np} w_i \left(d_i^{prod,sim} - d_i^{prod,mes}\right)^2\right)^{1/2}$$

where $d_i^{prod,sim}$ is an i-th simulated production datum, Np is a number of production data, $d_i^{prod,mes}$ is an i-th measured production datum and $w_i$ is a weight.

12. A method as claimed in claim 2, wherein:

a number of the classes is greater than two and a set of binary images is constructed for each seismic attribute image; and for each binary image containing two classes, dissimilarity of the classified images is defined by a weighted sum of dissimilarities of the binary images.

13. A method as claimed in claim 12, wherein the classified images are obtained by k-means classification.

14. A method as claimed in claim 13 wherein, prior to classification, a portion of noise contained in the images of the seismic attributes is removed through filtering.

15. A method as claimed in claim 12 wherein, prior to classification, a portion of noise contained in the images of the seismic attributes is removed through filtering.

16. A method as claimed in claim 2, wherein the classified images are obtained by k-means classification.

17. A method as claimed in claim 16 wherein, prior to classification, a portion of noise contained in the images of the seismic attributes is removed through filtering.

18. A method as claimed in claim 2 wherein, prior to classification, a portion of noise contained in the images of the seismic attributes is removed through filtering.

19. A method as claimed in claim 2, wherein said difference between the measured production data and the simulated production data is measured by an objective function defined as follows:

$$OF_{prod} = \frac{1}{2}\left(\sum_{i=1}^{Np} w_i \left(d_i^{prod,sim} - d_i^{prod,mes}\right)^2\right)^{1/2}$$

where $d_i^{prod,sim}$ is an i-th simulated production datum, Np is a number of production data, $d_i^{prod,mes}$ is an i-th measured production datum and $w_i$ is a weight.

20. A method as claimed in claim 1, wherein:

a number of the classes is greater than two and a set of binary images is constructed for each seismic attribute image; and for each binary image containing two classes, dissimilarity of the classified images is defined by a weighted sum of dissimilarities of the binary images.

21. A method as claimed in claim 20, wherein the classified images are obtained by k-means classification.

22. A method as claimed in claim 21 wherein, prior to classification, a portion of noise contained in the images of the seismic attributes is removed through filtering.

23. A method as claimed in claim 20 wherein, prior to classification, a portion of noise contained in the images of the seismic attributes is removed through filtering.

24. A method as claimed in claim 20, wherein said difference between the measured production data and the simulated production data is measured by an objective function defined as follows:

$$OF_{prod} = \frac{1}{2}\left(\sum_{i=1}^{Np} w_i(d_i^{prod,sim} - d_i^{prod,mes})^2\right)^{1/2}$$

where $d_i^{prod,sim}$ is an i-th simulated production datum, Np is a number of production data, $d_i^{prod,mes}$ is an i-th measured production datum and $w_i$ is a weight.

25. A method as claimed in claim 1, wherein the classified images are obtained by k-means classification.

26. A method as claimed in claim 25 wherein, prior to classification, a portion of noise contained in the images of the seismic attributes is removed through filtering.

27. A method as claimed in claim 25, wherein said difference between the measured production data and the simulated production data is measured by an objective function defined as follows:

$$OF_{prod} = \frac{1}{2}\left(\sum_{i=1}^{Np} w_i(d_i^{prod,sim} - d_i^{prod,mes})^2\right)^{1/2}$$

where $d_i^{prod,sim}$ is an i-th simulated production datum, Np is a number of production data, $d_i^{prod,mes}$ is an i-th measured production datum and $w_i$ is a weight.

28. A method as claimed in claim 1 wherein, prior to classification, a portion of noise contained in the images of the seismic attributes is removed through filtering.

29. A method as claimed in claim 28, wherein said difference between the measured production data and the simulated production data is measured by an objective function defined as follows:

$$OF_{prod} = \frac{1}{2}\left(\sum_{i=1}^{Np} w_i(d_i^{prod,sim} - d_i^{prod,mes})^2\right)^{1/2}$$

where $d_i^{pro,sim}$ is an i-th simulated production datum, Np is a number of production data, $d_i^{prod,mes}$ is an i-th measured production datum and $w_i$ is a weight.

30. A method as claimed in claim 1, wherein said difference between the measured production data and the simulated production data is measured by an objective function defined as follows:

$$OF_{prod} = \frac{1}{2}\left(\sum_{i=1}^{Np} w_i(d_i^{prod,sim} - d_i^{prod,mes})^2\right)^{1/2}$$

where $d_i^{prod,sim}$ is an i-th simulated production datum, Np is a number of production data, $d_i^{prod,mes}$ is an i-th measured production datum and $w_i$ is a weight.

31. A method as claimed in claim 1, wherein the local dissimilarities are minimized using an objective function defined as follows:

$$OF_{sismiq} = \frac{1}{2}\left(\sum_{i=1}^{N} (CDL(i))^2\right)^{1/2}$$

where N is a number of pixels of the seismic attribute images and CDL(i) is a local dissimilarity at a pixel i.

32. A method as claimed in claim 1, wherein the production data comprise fluid flow rate data measured at at least at one well drilled through the underground medium and concentrations of tracers injected into the underground medium.

33. A method as claimed in claim 1, wherein the at least one parameter is selected from among characteristic properties of the medium.

34. A method in accordance with claim 33, wherein the characteristic properties are porosity and permeability.

* * * * *